T. L. BURTON.
BRAKE RIGGING.
APPLICATION FILED FEB. 17, 1916.
1,249,320.
Patented Dec. 11, 1917.
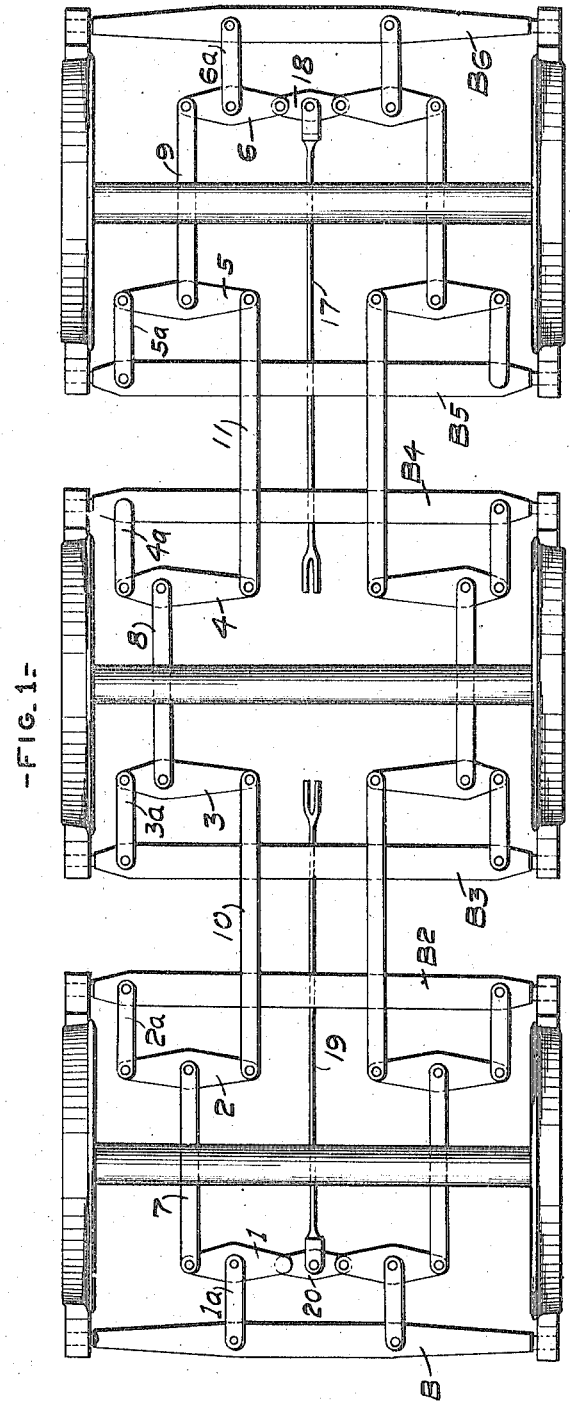
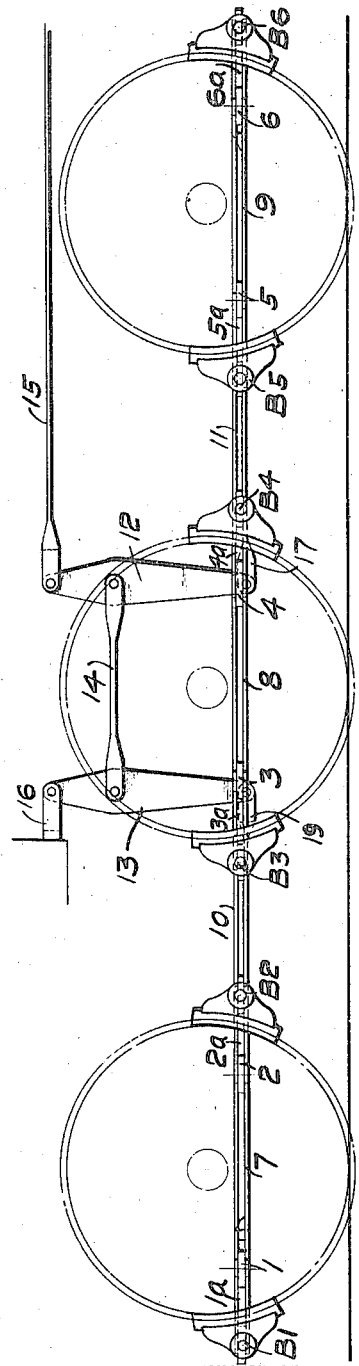
INVENTOR
Thomas L. Burton
by Edward A. Wright
Atty

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING.

1,249,320.  Specification of Letters Patent.  Patented Dec. 11, 1917.

Application filed February 17, 1916. Serial No. 78,813.

*To all whom it may concern:*

Be it known that I, THOMAS L. BURTON, of St. Louis, in the State of Missouri, have invented a certain new and useful Improvement in Brake-Rigging, of which improvement the following is a specification.

This invention relates to brake rigging of the clasp type, adapted for use on pivoted railway trucks having a plurality of pairs of wheels with brake beams and shoes, applied to both sides of each pair of wheels.

The object of my invention is to provide an improved construction of this type in which duplicate sets of substantially horizontal truck levers are employed, one set at each side of the truck, below the car axles, and a pair of substantially vertical intermediate levers with connections at their lower ends to the respective truck levers at opposite ends of the truck, whereby the power is transmitted from opposite ends of said truck lever system toward the middle, and the stresses are balanced against themselves, thereby eliminating all fixed fulcrums on the truck frame for said truck levers.

In the accompanying drawing: Figure 1 is a plan of one form of clasp brake rigging embodying my improvement, the vertical levers being omitted; and Fig. 2, a side elevation.

According to the construction shown, the improvement is applied to a six wheeled truck having brake beams, $B^1$, $B^2$, $B^3$, $B^4$, $B^5$ and $B^6$, carrying brake shoes at their ends and located on both sides of each pair of wheels, with duplicate sets of substantially horizontal truck levers, 1, 2, 3, 4, 5 and 6, upon opposite sides of the truck, and approximately in the same plane with the brake beams below the axles, there being a pair of truck levers for each brake beam, and preferably connected thereto by suitable links, such as $1^a$, $2^a$, $3^a$, $4^a$, $5^a$ and $6^a$, respectively. The truck levers of each pair of wheels are connected together by the respective tie bars, 7, 8 and 9, while the adjacent truck levers of adjoining pairs of wheels are connected by the tie bars, 10 and 11, respectively.

For the purpose of operating the sets of truck levers, I provide a pair of substantially vertical intermediate levers, 12 and 13, preferably located near the center of the truck, and connected at their lower ends by the respective rods, 17 and 19, with the cross equalizers, 18 and 20, and the corresponding pairs of horizontal truck levers, 6 and 1, at the opposite ends of the truck. One of said intermediate levers is a live or floating lever, such as 12, connected at its upper end to the brake cylinder pull rod, 15, while the other or dead lever, 13, has a fixed fulcrum, 16, on the frame, said levers being coupled together by the rod, 14.

As the power is applied from the brake cylinder pull rod to the intermediate live lever, 12, and through coupling rod, 14, to the dead lever, 13, it will be seen that the lower ends of said levers are moved in opposite directions, that is, toward each other, and operating through rods, 17 and 19, transmit the power to the pairs of truck levers at opposite ends of the truck. In this manner the stresses are transmitted through the horizontal lever system from the opposite ends toward the middle, thus reacting against each other, and forming a balanced system independent of the truck frame. It will be noticed that the truck levers, 1 and 6, at the opposite ends of the truck, are connected at their intermediate pivots, to the outside brake beams, $B^1$ and $B^6$, while all of the other brake beams are pivotally connected at the ends of their respective truck levers.

This improved design of brake rigging is particularly applicable to certain complex forms of trucks, as the horizontal system of truck levers, rod connections, and brake beams are all located in substantially the same plane below the axles and members of the truck frame, and the pair of intermediate vertical levers may usually be readily inserted between the members of the truck frame. The only fixed connection of the floating system to the truck is at the fulcrum, 16, of the intermediate dead lever, 13, which is at the top portion of the truck near the center, where it is not objectionable, and the entire lower portion of the truck is thereby relieved from all braking stresses.

Having now described my invention, what I claim as new and desire to secure by Letters Patent is:

1. In a brake rigging for trucks having a plurality of pairs of wheels, the combination with brake shoes applied to both sides of each pair of wheels, and a double set of substantially horizontal truck levers and rods, one set on each side of the truck, of an intermediate vertical floating lever having connections to the truck levers at opposite ends of the truck.

2. In a brake rigging for trucks having a plurality of pairs of wheels, the combination with brake beams applied to both sides of each pair of wheels, and a double set of truck levers and connecting rods, there being a pair of live truck levers for each brake beam, of an intermediate floating lever for transmitting power to said truck levers.

3. In a brake rigging for trucks having a plurality of pairs of wheels, the combination with brake beams applied to both sides of each pair of wheels, and a double set of truck levers and connecting rods, there being a pair of live truck levers for each brake beam, of an intermediate vertical floating lever having connections to the truck levers at opposite ends of the truck.

4. In a brake rigging for trucks having a plurality of pairs of wheels, the combination with brake shoes applied to both sides of each pair of wheels, and a double set of substantially horizontal truck levers and rods, one set on each side of the truck, of a pair of intermediate vertical levers having connections at their lower ends with the truck levers at the opposite ends of the truck.

5. In a brake rigging for trucks having a plurality of pairs of wheels, the combination with brake beams applied to both sides of each pair of wheels, and a double set of truck levers and connecting rods, there being a pair of live truck levers for each brake beam, of a pair of intermediate vertical levers having connections respectively to the truck levers at the opposite ends of the truck.

In testimony whereof I have hereunto set my hand.

THOMAS L. BURTON.

Copies of this patent may be obtained for five cents each, by addressing the "Commissioner of Patents, Washington, D. C."